(12) United States Patent
Wang et al.

(10) Patent No.: US 11,462,047 B1
(45) Date of Patent: Oct. 4, 2022

(54) DEVICE HAVING A CAMERA OVERLAID BY DISPLAY AS BIOMETRIC SENSOR

(71) Applicant: Lenovo (Singapore) Pte. Ltd., New Tech Park (SG)

(72) Inventors: Mengnan Wang, Chapel Hill, NC (US); Daryl C. Cromer, Raleigh, NC (US); John W. Nicholson, Cary, NC (US); Howard Locker, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 17/308,170

(22) Filed: May 5, 2021

(51) Int. Cl.
| | |
|---|---|
| *G06V 40/12* | (2022.01) |
| *G06V 40/13* | (2022.01) |
| *H04N 5/225* | (2006.01) |
| *H04N 5/232* | (2006.01) |
| *H04N 5/247* | (2006.01) |

(52) U.S. Cl.
CPC ...... *G06V 40/1318* (2022.01); *G06V 40/1365* (2022.01); *H04N 5/2257* (2013.01); *H04N 5/23212* (2013.01); *H04N 5/247* (2013.01)

(58) Field of Classification Search
CPC .......... G06V 40/1318; G06V 40/1365; H04N 5/2257; H04N 5/23212; H04N 5/247
USPC ....................................................... 348/77
See application file for complete search history.

(56) References Cited

U.S. PATENT DOCUMENTS

| | | | | |
|---|---|---|---|---|
| 2014/0253711 | A1* | 9/2014 | Balch | G06V 40/13 348/77 |
| 2018/0157411 | A1* | 6/2018 | Kim | G06F 3/04886 |
| 2018/0276468 | A1* | 9/2018 | Lee | G06V 30/142 |
| 2020/0110921 | A1* | 4/2020 | Mather | G06V 40/1365 |
| 2020/0301536 | A1* | 9/2020 | Zhang | H01L 27/323 |
| 2020/0363902 | A1* | 11/2020 | Choi | G06F 21/32 |
| 2021/0174067 | A1* | 6/2021 | Chang | G06V 40/172 |
| 2021/0360154 | A1* | 11/2021 | Slobodin | H04N 7/144 |

FOREIGN PATENT DOCUMENTS

| | | | | |
|---|---|---|---|---|
| WO | WO-2021097719 | A1 * | 5/2021 | G02B 6/0055 |

* cited by examiner

*Primary Examiner* — Christopher S Kelley
*Assistant Examiner* — Kathleen M Walsh
(74) *Attorney, Agent, or Firm* — The Small Patent Law Group LLC; Dean D. Small

(57) ABSTRACT

An electronic device is provided having a camera under a display. The electronic device includes a display screen having display pixels and openings separating the display pixels, and a camera located proximate to the display and configured to obtain image data through the openings separating the display pixels. The image data includes near field image data and far field image data. The camera includes a first lens and an imaging sensor assembly. The imaging sensor assembly is configured to detect near field image data at the display screen and far field image data spaced from the display screen. The electronic device also includes a processor that is configured to capture the near field image data in a first mode, capture the far field image data in a second mode, and identify a user of the electronic device based on the near field image data.

20 Claims, 4 Drawing Sheets

DEVICE HAVING A CAMERA OVERLAID BY DISPLAY AS BIOMETRIC SENSOR

FIELD

The present disclosure relates generally to implementing a camera behind a display of a device.

BACKGROUND OF THE INVENTION

Common smartphones, tablets, laptop computers, and other mobile electronic devices include both a display surface and a front-facing camera on the front side of the device. Display technologies employed in these mobile electronic devices include liquid-crystal display (LCD) or active-matrix organic light-emitting diode (AMOLED). Typically, the display surface does not occupy the full front side of the mobile electronic device because a bezel, border, or notch is required to accommodate the lens of the front-facing camera. As a result, the size of the display surface is reduced. Given the limited area of the front surface of mobile electronic devices, it is desirable to eliminate any bezels, borders, or notches to increase the display area.

A front-facing camera of a mobile electronic device that is placed underneath the display in a low display pixel density area may be used for taking self-portraits, for video calls, as well as other applications. Front-facing cameras continue to increase in resolution to increase the quality of images and videos captured thereby. Such systems are considered camera-under-display (CUD) systems because the camera is placed under the display screen.

A drawback of CUD systems is that functionality of other systems is limited as a result of the hardware required to implement the CUD systems. For example, biometric sensors such as those that scan a user's facial profile are not usable. As a result of the camera being under the display, the detailed imaging necessary to allow facial recognition is difficult to achieve. Meanwhile, adding additional hardware under the display of a sensor capable providing facial recognition, or other biometric sensors such as fingerprint sensors similarly is undesired. In particular, the system already includes a CUD region where the density of display pixels is reduced to allow for the camera functionality, so the addition of a biometric sensor results in a second region where the density of display pixels must be reduced. As a result, the image quality of the display is reduced. In addition, often such regions can be detected by a user or others resulting in a lower quality impression based on the aesthetics presented.

SUMMARY

In accordance with embodiments herein, an electronic device having a camera under a display is provided that includes a display screen having display pixels and openings separating the display pixels, and a camera located proximate to the display and configured to obtain image data through the openings separating the display pixels. The image data includes both near field image data and far field image data. The camera includes a first lens and an imaging sensor assembly, the imaging sensor assembly configured to detect near field image data at the display screen and far field image data spaced from the display screen. The electronic device also includes a processor and a memory storing program instructions accessible by the processor. Responsive to execution of the program instructions, the processor is configured to capture the far field image data in a first mode, capture the near field image data in a second mode, and identify a user of the electronic device based on the near field image data.

Optionally, in the first mode the processor is configured to capture front-facing far field image data. In addition, the near field image data includes fingerprint data and in the second mode the processor is configured to read the fingerprint data using variable focus. In one aspect, the imaging sensor assembly includes an imaging sensor that is configured to enable a variable focal length that has a range for capturing far field image data including user portraits in the first mode to capturing near field image data including macro imaging for fingerprint reading in the second mode. In another aspect, the identification of the user is based on the macro imaging for fingerprint reading in the second mode. In one example, the imaging sensor assembly is a biosensor in the second mode.

Optionally, the imaging sensor assembly includes a first imaging sensor that receives a first light path to generate near field imaging data, and a second imaging sensor that receives a second light path to generate far field imaging data. In one aspect, the imaging sensor assembly includes an optical reflector configured to form the first light path and the second light path. In another aspect, the optical reflector is configured to move from a first position that provides the first light path in the first mode, to a second position that provides the second light path in the second mode. In one example, the first light path and second light path are parallel to the display screen. In another example, the first lens is a macro lens. In yet another example, one or more light elements are disposed proximate the camera, and responsive to execution of the program instructions, the processor is to modify the one or more light elements to provide an auxiliary light output based on operation of the camera in the first mode or the second mode.

In accordance with embodiments herein, a method is provided where under control of one or more processors including program instructions to capture, with a camera, far field image data in a first mode, and capture, with the camera, near field image data in a second mode. The method also includes to monitor an electronic device that includes the camera under a display screen, to determine operation of the electronic device, switch from the first mode to the second mode in response to determining the operation of the electronic device, and identify a user of the electronic device based on the near field image data.

Optionally, capturing far field image data in the first mode includes capturing front-facing far field image data. In one aspect, the one or more processors include program instructions further to read fingerprint data using variable focus in the second mode. In another aspect, to capture the near field image data in the second mode includes focusing the camera on the display screen. In one example to capture the far field image data in the first mode includes focusing the camera spaced from the display screen. In another example monitoring the electronic device includes at least one of communicating with a security application, or determining the electronic device is locked, or determining the electronic device is using a screen saver on the display screen. In yet another example, identifying the user includes capturing near field image data of a fingerprint of the user, obtaining a previously recorded user fingerprint, and comparing the near field image data of the fingerprint of the user to the previously recorded user fingerprint.

In accordance with embodiments herein, an electronic device having a camera under a display is provided that includes a display screen having display pixels and openings separating the display pixels, and a camera located proximate to the display and configured to obtain front facing image data through the openings separating the display pixels. The front image data includes near field image data and far field image data, and the camera includes a macro lens and an optical reflector configured to generate a first light path and a second light path. The electronic device also includes an imaging sensor assembly configured to capture front facing far field image data including user portraits in a first mode and operate as a biosensor to capture near field image data including macro imaging for fingerprint reading in the second mode. Optionally, the imaging sensor assembly includes a first imaging sensor configured to receive the first light path to detect the front facing far field image data, and a second imaging sensor configured to receive the second light path to detect the near field image data.

DETAILED DESCRIPTION

Figure 1:
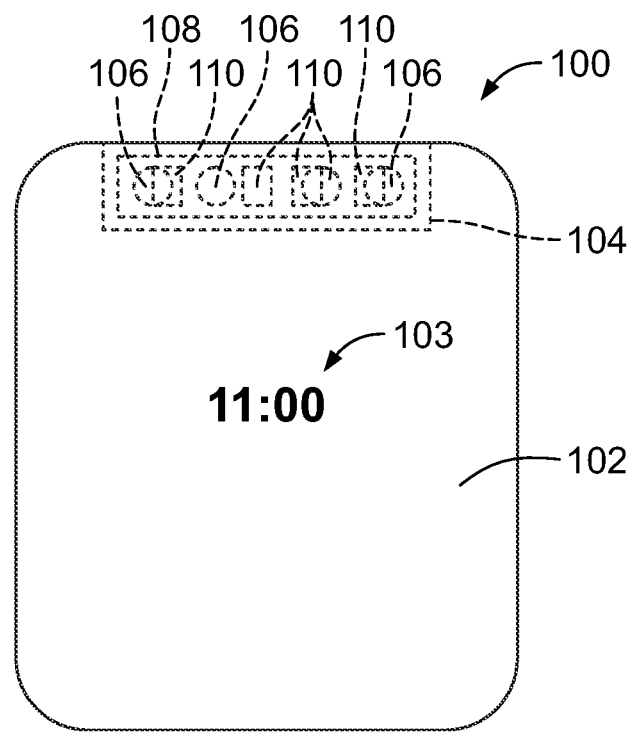
FIG. 1 illustrates a simplified block diagram of an electronic device in accordance with an embodiment herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

Provided is a camera under the display of an electronic device and method for utilizing the camera in a first mode to capture far field image data, and utilizing the camera in a second mode to capture near field image data for use as a biometric sensor. The camera includes a first lens and an imaging sensor assembly. The imaging sensor assembly is configured to detect near field image data at the display screen and far field image data spaced from the display screen. The electronic device also includes a processor configured to capture the near field image data in the first mode, and switch the camera to capture the far field image data in the second mode to identify a user of the electronic device.

The term "display pixel(s)" shall mean any area of illumination on a display screen that combines to form an image on the display screen. The area of illumination is an image element. The image formed may be a solid color, strip, item, person, numbers, letters, background, boarder, etc.

The term "camera display pixel(s)" shall mean any and all display pixels that are proximate to a camera or camera sensors. In this manner, the camera display pixels either block, partially block, or define openings that allow the passage of light so that the camera can obtain image data. Specifically, the camera display pixels include display pixels that can affect the degree of light capture of the camera. The camera display pixels are only in the proximate area of the camera. As such, the camera display pixels only form a portion of the display screen.

The term "image data" shall mean data associated with one or more of two-dimensional (2-D) images, three-dimensional (3-D) images, panoramic images, still images, and/or video images. Image data can include near field image data and far field image data.

The term "near field image data" shall mean any and all image data captured at the display screen of an electronic device. Near field image data is typically captured by an imaging sensor with a short focal length, including less than an inch. Near field image data includes image data that can be utilized to identify a user, and does not include facial recognition. As an example, image data of a finger pressed against the display screen is near field image data because the image data is obtained when the camera is using an imaging sensor that focuses on the image data at the display screen of the electronic device. To this end, near field image data includes fingerprint data.

The term "far field image data" shall mean any and all image data that is not near field image data. As an example, all image data received from objects that are spaced from the display screen are far field image data. Such far field image data includes a finger that is spaced from the display screen. The far field image data in another example is obtained when the camera is using an imaging sensor that focuses on the image data spaced from the display screen.

The term "mode" shall mean a state of operation of an electronic device, system, assembly, device, camera, etc. In an example, a camera can operate in two separate modes, a first mode where far field image data is obtained, and a second mode where near field image data is obtained. In particular, by having two distinct functionalities, two states of operation are presented. Further, additional structure is not required to present a first mode and a second mode. As an example, a single imaging sensor can be configured to function provide a wide focal length variation with variable focus in order to provide an image data capture range that includes both near field image data and far field image data. In one such example, the imaging sensor is a variable focal length image sensor that can accommodate a variable focal length. Alternatively, additional structure can result in operation in a first mode and second mode. For example, a first imaging sensor may receive a first light path created to direct near field image data to the first imaging sensor. Meanwhile, a second imaging sensor may also be provided that may receive a second light path created to direct far field image data to the second imaging sensor. Again, in this manner a first mode and second mode are presented.

The phrase "optical reflector" shall mean any and all devices that can function to reflect light. Example optical reflectors include mirrors, surfaces, certain colors, or the like. Optical reflectors shall include devices that can also vary light in other manners. As an example, a polarized lens may be presented that when polarized reflects light, and when not polarized transmits, refracts, varies, etc. the light. Still, the polarized lens is able to function to reflect light, and thus is an optical reflector.

The phrase "macro lens" shall have a meaning as is understood in the field of optics. In particular, macro lens shall mean an optic configured to have a minimized focus distance. In one example, a macro lens has a magnification ratio of 1 to 1 and a focusing distance of less than twelve inches (30 centimeters). In another embodiment, the magnification ratio is 1 to 1 and the focusing distance is less than an inch (2.5 cm).

The phrase "auxiliary light output" shall mean any light provided at a display screen level by a light element that is not a display pixel. The light element may be on a substrate proximate the display screen, on a substrate that includes camera sensors, on or coupled to a display layer, etc. The light element may be a light emitting diode, a pixel, current controlled, etc. The light element may change colors, change intensity or brightness, activate, deactivate, or the like.

The phrase "identify a user" shall mean the fact of who the user is. The "identity of a user" shall not mean an educated guess of who the user is. In order to identify a user of an electronic device, no other potential users can be identified. For example, software that includes facial recognition software that provides the names of individuals within image data does not identify a user as used herein. Specifically, a third party can capture an image of an electronic device owner, and the facial recognition software then provides the name of the user. In such an instance the user (e.g. third party) has not been identified. In contrast, when near field image data of a fingerprint of a user is utilized, only the user can provide such fingerprint, and as such, the user is identified because no other possible third party could provide such a fingerprint.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

The terms "processor," "a processor", "one or more processors" and "the processor" shall mean one or more processors. The one or more processors may be implemented by one, or by a combination of more than one implantable medical device, a wearable device, a local device, a remote device, a server computing device, a network of server computing devices and the like. The one or more processors may be implemented at a common location or at distributed locations. The one or more processors may implement the various operations described herein in a serial or parallel manner, in a shared-resource configuration and the like.

FIG. 1 illustrates an electronic device 100 that may be implemented in connection with devices having a camera positioned under, or behind, the display surface or display stack of the electronic device. For example, electronic devices having bezel-less and/or notch-less display surfaces may include front-facing cameras placed under, or behind a display stack of an electronic device. The electronic device 100 may be stationary or portable/handheld.

The electronic device 100 includes a display screen 102 that displays an image 103 thereon. The image may include colors, patterns, pictures, letters, numbers, symbols, etc. Specifically, as will be described in further detail herein, the display screen 102 in one example is a display stack that includes numerous display pixels that each individually provides a different display light output, such as color, brightness, or the like. The display pixels in combination provide a display light output that is provided to form the image on the display screen 102.

The display screen 102 includes a camera under device (CUD) region 104. At the CUD region 104 is a camera 106 that is provided underneath the display screen 102. In one example, plural cameras, and specifically camera sensors are provided. Alternatively, only a single camera is provided. The camera 106 is configured to obtain and capture image data through openings defined by the display pixels. By having the camera 106 located under the display and capturing image data through the openings, the camera is configured to capture front-facing far field image data. Specifically, the front of the electronic device is the display side of the electronic device, allowing for user portraits such as selfie type images of the user. In addition, the camera is also configured to capture near field images such as a fingerprint against the display screen 102. In this manner, image data include far field image data and near field image data. The display pixels proximate to the camera 106 in the CUD region 104 are considered camera display pixels. In particular, the camera display pixels have a density that is less than a density of non-camera display pixels to define more openings and open space for the camera 106 to obtain the image data.

In, around, or adjacent the camera 106 can be a substrate 108 that includes plural light elements 110 proximate the openings defined by the camera display pixels. The light elements 110 in one example are light emitting diodes (LEDs). The light elements 110 are configured to be operated by one or more processors of the electronic device 100 to emit an auxiliary output light to supplement the display light output. Specifically, the one or more processors in example embodiments monitor the display screen 102 to determine display information resulting from the display light output. The display information can include color of display pixels, brightness of display pixels, or the like. To this end, in one example, the one or more processors monitor the color and brightness of the display pixels. Then, to supplement the display pixels, colors, brightness, etc., the light elements 110 can provide the auxiliary output light.

Figure 2:
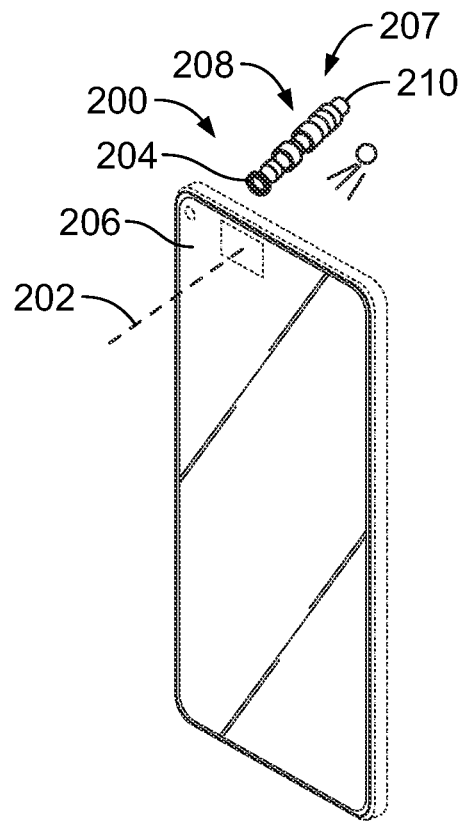
FIG. 2 illustrates a simplified schematic diagram of a camera in accordance with an embodiment herein.

In another embodiment, a functionality, or mode, of the of the electronic device 100 can be monitored by the one or more processors to vary the auxiliary output light based on certain operations of the electronic device 100. For example, operation of the camera 106 may include a first mode where the camera functions to obtain near field image data related to an individual's fingerprint. In such a first mode, an imaging sensor may function at a first focal length for capturing a near field image of the fingerprint, as compared to a second mode where the imaging sensor may function at a second focal length for obtaining far field image data in the environment spaced from the display of the electronic device. (FIG. 2). Alternatively, in a first mode a first imaging sensor that detects near field images is used, while in the second mode a second imaging sensor that detects far field images of the environment is used. (FIGS. 3A, 3B, 4A, 4B). In each embodiment, in the first mode, when a user's finger is pressed against the display 102 for identification purposes, the finger blocks light from the environment. As a result, the one or more processors can increase the auxiliary output light in the first mode to provide the auxiliary light output for improving image capturing of the near field image data that in one example is a fingerprint. Then, in the second mode the auxiliary light output can be reduced or eliminated to save battery life when the auxiliary light output is unneeded. In addition, in one example, at least some of the plural light elements 110 can be moveable from a first position to a second position to be directed to facilitate the capture of near field image data in the first mode, and directed in a different second direction when capturing far field image data in the second mode.

FIG. 2 illustrates an example camera 200 that may be utilized to capture both near field image data far field image data. The camera 200 in one example is the camera 106 of FIG. 1 that is a CUD. The camera 200 captures reflected light from an object being imaged. In particular, the light reflected from the object being imaged presents a light path 202 that is obtained by the camera, and altered for sensing.

After being reflected from the surface of an object being imaged, light along the light path 202 reaches a first lens 204. In one example the first lens 204 is a macro lens that enables focus of the light path 202 in the near field at a display screen 206 of an electronic device. In one example, the macro lens has a magnification ratio of 1 to 1 and a focusing distance of less than twelve inches (30 centimeters). In another embodiment, the macro lens has a magnification ratio of 1 to 1 and the focusing distance is less than an inch (2.5 cm). In this manner, enhanced image data of a finger pressed against a display screen 206 adjacent the first lens 204 is obtained. The enhanced image data allows for the camera 200 to function in a first mode as a biometric scanner that can read fingerprint data and identify individual fingerprints as a result of the captured near field data.

In the embodiment of FIG. 2, the first lens 204 is a concave lens that expands the light path 202 before being received by an imaging sensor assembly 207. The imaging sensor assembly 207 includes a zoom lens assembly 208 that has a combination of lenses that may be moveable in relation to one another to provide the zoom functionality. In particular, a zoom lens assembly 208 functions to move a focal point to converge reflected light from varying distances away from the display screen 206 of the electronic device before the light path 202 is received by an imaging sensor 210 of the imaging sensor assembly 207.

In the embodiment of FIG. 2, the imaging sensor assembly 207 is configured to provide a wide range of focal point changes resulting in wide focal length variation with variable focus, and only a single imaging sensor 210 is provided. Specifically, the imaging sensor can include a short focal length such as less than an inch for near field image data and longer focal lengths for far field image data. In one example the imaging sensor 210 is a variable focal length sensor that can accommodate a variable focal length. The imaging sensor 210 is configured to convert the light path 202 into image data for a large range of focal points, including those in both a near field and a far field. In particular, the zoom lens assembly 208 and imaging sensor 210 may accommodate near field images when the first lens is a macro lens and process such image data in a first mode when the camera functions as a biosensor. Meanwhile, the zoom lens assembly 208 and imaging sensor 210 can also accommodate far field images within the field of view of the camera 200 when operating in a second mode, such as when in a camera operating mode. In this manner, the camera 200 functions as both a camera, and a biosensor, eliminating the need for an additional biosensor. In addition, only one region of the display is required to have a density of display pixels that is less than other regions of the display as a result of the dual functionality. Therefore, a more aesthetically appealing electronic device using the camera 200 is provided.

Figure 3A:
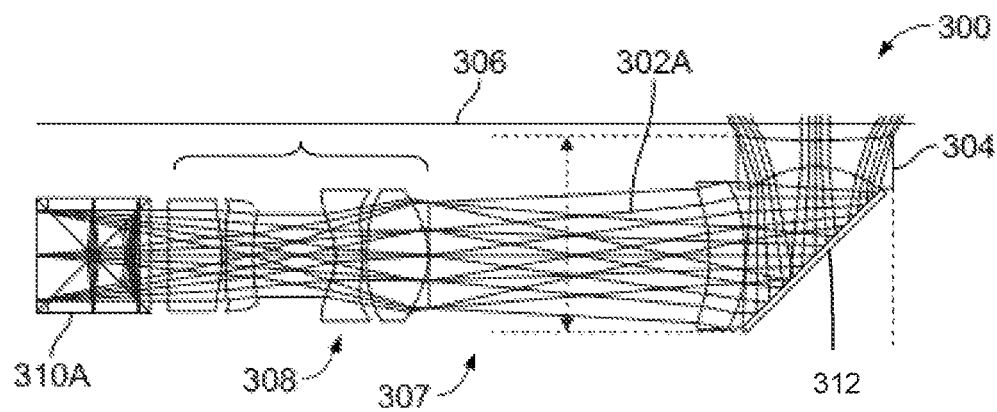
FIG. 3A illustrates a simplified schematic diagram of a camera in accordance with an embodiment herein.
Figure 3B:
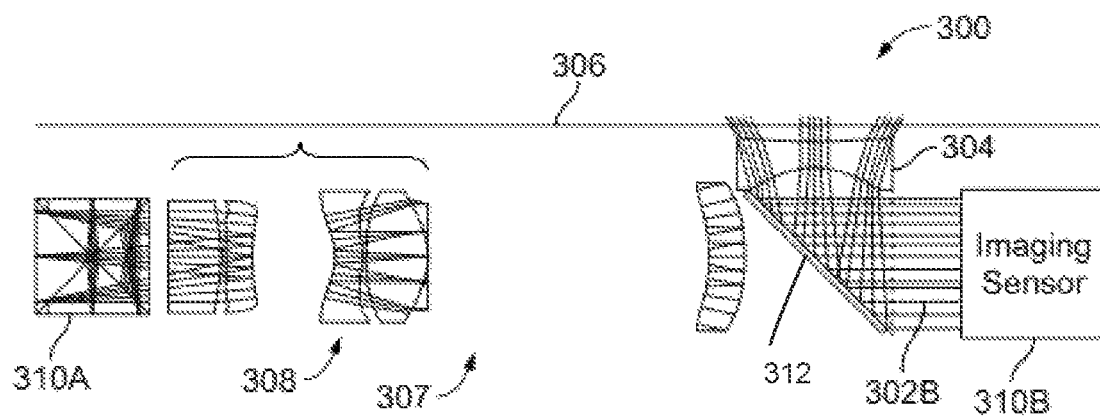
FIG. 3B illustrates a simplified schematic diagram of a camera in accordance with an embodiment herein.

FIGS. 3A and 3B illustrate an alternative embodiment of a camera 300. In this example, a first light path 302A (FIG. 3A) and second light path 302B (FIG. 3B) are provided such that the camera 300 can have biosensor functionality. In particular, the camera 300, similar to the embodiment of FIG. 2, includes a first lens 304 that in one example is a macro lens. The macro lens enables focus of a light path 302A or 302B in close proximity to the macro lens, otherwise referred to as macro imaging. In this manner, enhanced image data of near field images, such as a finger pressed against a display screen 306 adjacent the first lens 304, such as fingerprint data is obtained. Such macro imaging can then be utilized for fingerprint reading. As such, the enhanced near field image data allows for the camera 300 to function in a first mode as a biometric scanner that can identify individual fingerprints. Specifically, in the second mode, the processor is configured to read the fingerprint data including through using variable focus to make the identification. More specifically, near field image data including macro imaging is provided for the fingerprint reading.

In the embodiment illustrated in FIGS. 3A and 3B, again, an imaging sensor assembly 307 with a zoom lens assembly 308 is utilized to provide varying focal lengths for processing. However, in this example embodiment, the imaging sensor assembly 307 includes a first imaging sensor 310A and second imaging sensor 310B instead of having a single imaging sensor having a wide focal length variation and variable focus as the embodiment of FIG. 2. Specifically, forming a zoom lens assembly and accompanying imaging sensor that accommodates a large range of focal length can add complexity and expense to the camera. Instead, in the embodiment of FIGS. 3A and 3B, the imaging sensor assembly 307 includes an optical reflector 312 that is utilized after the light in the light path 302A or 302B passes through the first lens 304. In in the embodiment of FIGS. 3A and 3B, when an optical reflector 312 is in a first position (FIG. 3A), and thus in a first mode, the optical reflector 312 is at approximately 45° degrees from the display screen 306 to reflect the light from the first lens 304 along the first light path 302A through the zoom lens assembly 308 and into the first imaging sensor 310A. In this manner, the zoom lens assembly 308 can have lenses configured to have a much smaller focal length range as compared to the zoom lens assembly of FIG. 2. Similarly, the complexity of the first imaging sensor 310A may similarly be reduced to generate image data related to a smaller range of focal lengths. In one example, the first imaging sensor 310A is a far field imaging sensor, while the second imaging sensor 310B is a near field imaging sensor.

Then, in a second position (FIG. 3B), the optical reflector 312 is rotated to a second position, and operates in a second mode. In one example, in the second position, the optical reflector 312 is actuated by an actuating device (not illustrated) to rotate the optical reflector 180° degrees to reflect light from the first light element 304 in a direction opposite of the first light path 302A, and instead along a second light path 302B. In particular, the components of the camera 300 illustrated in FIGS. 3A-3B extend parallel to the display screen 306. Alternatively, no optical reflector 312 is utilized as provided in FIG. 2, and instead, the components of the camera 300 extend perpendicular, or vertically, from the display screen 306. Based on spatial requirements, the components of the camera can extend as needed.

With reference back to FIGS. 3A and 3B, along the second light path 302B, optionally a zoom lens assembly may be provided, or alternatively, just a second imaging sensor 310B is provided. The second imaging sensor 310B can be configured to provide image data related to light from the first light element 304 (e.g. the macro lens) such that the focal length allows for near field data capture, such fingerprint data capture. As a result of the near field data capturing, the camera is able to operate as a biosensor for identification purposes when the optical reflector 312 is in the second position, and can operate as a camera when the optical reflector 312 is in the first position. By using the optical reflector 312, the complexity of the zoom lens assembly 308 and/or the first and second imaging sensors 310A, 310B is reduced, resulting in lower manufacturing costs. In addition, the embodiment of FIGS. 3A and 3B still provide the improvement of a camera that functions as both a biosensor and a camera, resulting in a more aesthetically pleasing electronic device.

Figure 4A:
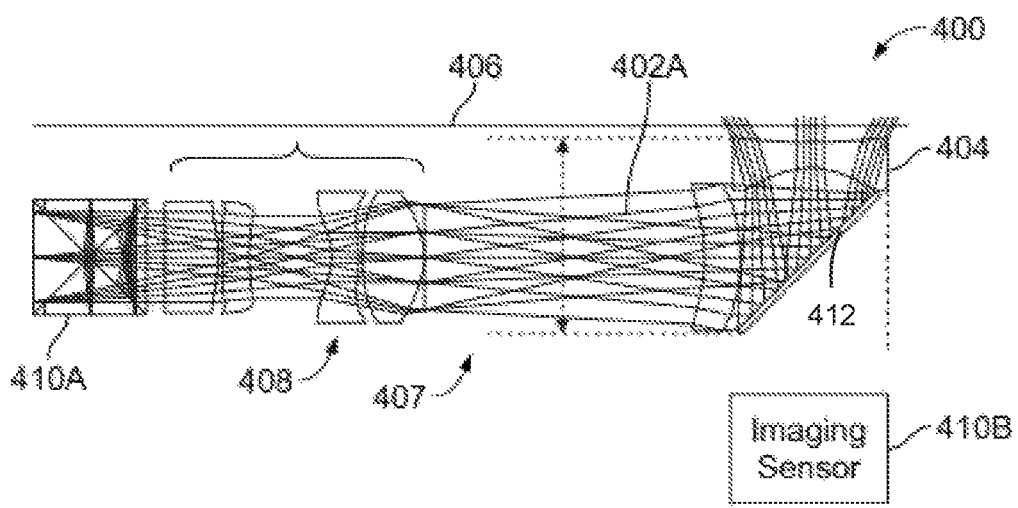
FIG. 4A illustrates a simplified schematic diagram of a camera in accordance with an embodiment herein.
Figure 4B:
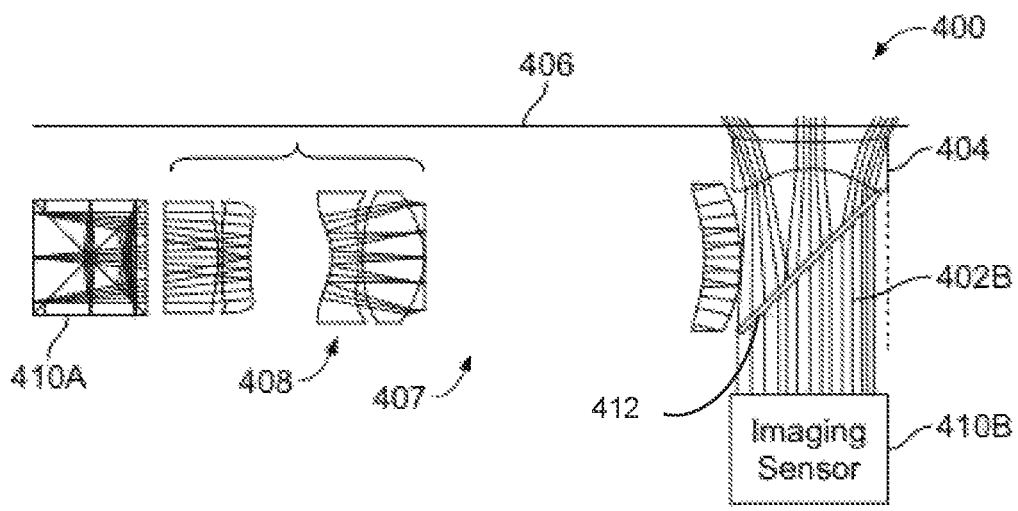
FIG. 4B illustrates a simplified schematic diagram of a camera in accordance with an embodiment herein.

FIGS. 4A and 4B illustrate yet another example embodiment of a camera 400. Similar to the example embodiment of FIGS. 3A and 3B, the camera 400 of the example embodiment of FIGS. 4A and 4B provide a first light path 402A (FIG. 4A) and second light path 402B to provide biosensor functionality. In this example embodiment the camera 400 includes a first lens 404 that in one example is a macro lens. The macro lens enables focus of a light path 402A or 402B in close proximity to the macro lens. In this manner, enhanced near field image data such as that of a finger pressed against a display screen 406 adjacent the first lens 404 is obtained. The enhanced near field image data allows for the camera 400 to function in a first mode as a biometer scanner that can identify individual fingerprints.

In the embodiment illustrated in FIGS. 4A and 4B, again, an imaging sensor assembly 407 having a zoom lens assembly 408 is utilized to provide varying focal lengths for processing. The imaging sensor assembly 407 also includes a first imaging sensor 410A and second imaging sensor 410B instead of having a single imaging sensor having a wide focal length variation and variable focus as the embodiment of FIG. 2. In one example, the first imaging sensor 410A is a far field imaging sensor, while the second imaging sensor 410B is a near field imaging sensor. Similar to the embodiment of FIGS. 3A and 3B, an optical reflector 412 is utilized after the light in the light path 402A or 402B passes through the first lens 404.

In the example embodiment of FIGS. 4A and 4B, the imaging sensor assembly 407 includes an optical reflector 412 at approximately 45° degrees from the display screen 406. Specifically, the optical reflector 412 is a polarized lens that in a first mode has a first polarization that reflects light to provide the first light path 402A to the zoom lens assembly 408 to the first imaging sensor 410A. The first imaging sensor 410A is configured to detect and provide far field image data for a range of focal lengths based on the camera 400 functioning in a first mode that is a camera mode. Meanwhile, in a second mode, when the optical reflector 412 has a second polarization, a second light path 402B is presented such that the light instead of being reflected by the optical reflector 412 is allowed to pass through the optical reflector 412 to the second imaging sensor 410B. The second imaging sensor 410B may handle focal lengths associated with the first lens 404 being a macro lens for capturing near field image data. In this manner, when the camera is operating in a first mode, a first polarization is provided, and light is reflected by the optical reflector 412 to capture far field image data, and the camera functions as a camera. When the camera is operating in a second mode, a second polarization is provided, and light is passed through the optical reflector 412 to the second imaging sensor 410B to capture near field image data, and the camera 400 functions as a biometric sensor. In this manner, by having an actuation device that simply changes the polarization of the optical reflector 412, no moving parts are presented reducing fatigue and mechanical malfunctioning and failures.

Figure 5:
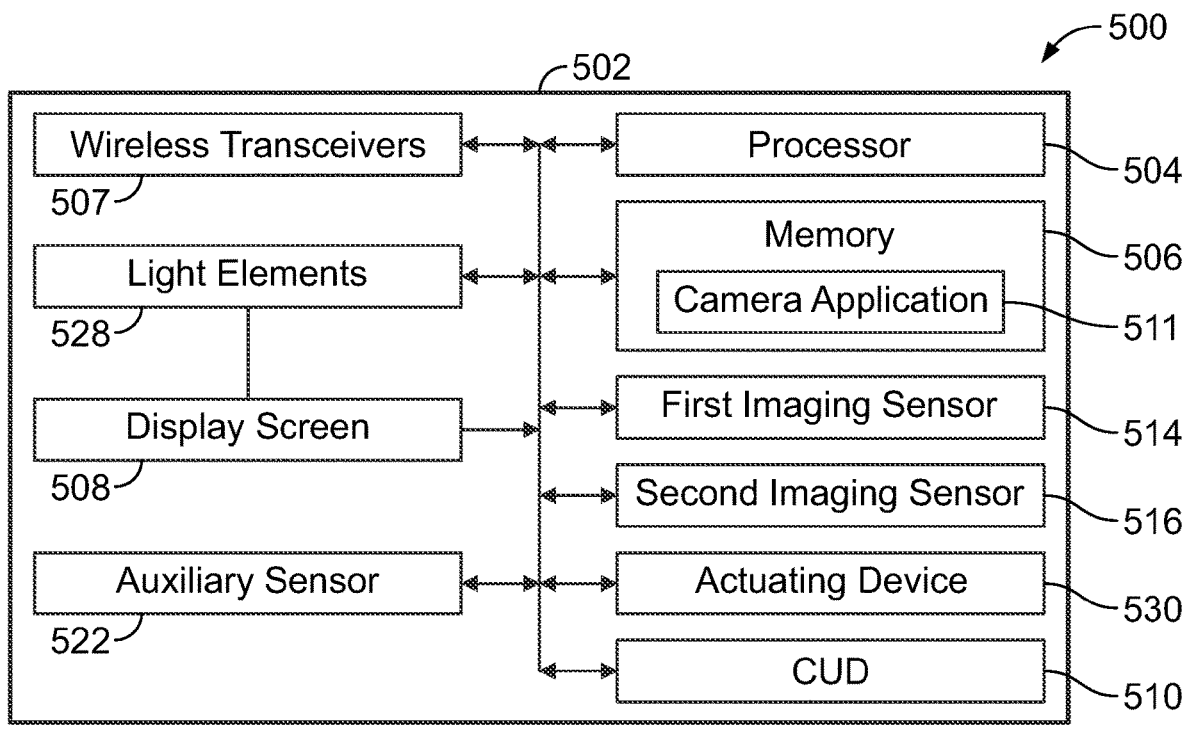
FIG. 5 illustrates a simplified schematic diagram of an imaging system in accordance with an embodiment herein.

FIG. 5 illustrates an imaging system 500 implementing a camera under, or behind, a display of an electronic device 502 in accordance with embodiments herein. The imaging system 500 includes the electronic device 502 that may be stationary or portable/handheld. The electronic device 502 includes, among other things, a processor 504, local storage medium 506, a transceiver 507, and a display screen 508 that in one example is graphical user interface. The electronic device 502 also includes a CUD 510. In one example, the CUD 510 is a camera as described in relation to any of FIGS. 1-4B.

In one embodiment, the local storage medium 506 includes a camera application 511 that controls the operation of the CUD 510. The camera application 511 can include program instructions that when executed by the processor 504 can implement the functionality of the CUD as described in relation to FIGS. 1-4B, and method of FIG. 6. The camera application 511 can be uploaded into the electronic device, downloaded onto the electronic device, etc. The camera application 511 can include settings, a user profile, manual operation, or actuation of the CUD 510, or the like. In one example, within the settings, a user may determine if they desire to use the CUD for security purposes. In particular, a user may determine if they desire the camera to function as a biometric scanning device to identify the user for the purpose of unlocking the electronic device, accessing other applications, making purchases, auto-populating personal information, including credit card or social security information, or the like. As such, the camera application operates to determine whether the camera is to operate in a first mode for capturing far field image data, or a second mode for capturing near field image data to provide biometric scanning identification functionality.

The electronic device 502 includes a housing that holds the processor 504, local storage medium 506, display screen 508, and CUD 510. In one example, the CUD 510 includes a first imaging sensor 514 and a second imaging sensor 516. While in one example first and second imaging sensors 514, 516 are provided (as provided in FIGS. 3A-4B), in another example embodiment, only one imaging sensor can be provided (as provided in FIG. 2). In one example the first imaging sensor 514 captures far field imaging data while the second imaging sensor 516 captures near field imaging data. In particular, the CUD 510 has a respective field of view, and thus degrees of light capture. The CUD 510 operates under control of the processor 504 in order to capture image data for a scene in the field of view obtained by the corresponding imaging sensors 514, 516.

In one example, an auxiliary sensor 522 can also be provided as part of the imaging system 500. For example, the auxiliary sensor 522 can be a pressure sensor, motion sensor, light sensor, or the like that is utilized to determine that a user's finger is pressed against the display screen. In this manner, when the imaging system 500 is operating in a second mode, and the second imaging sensor 516 captures near field imaging data, the auxiliary sensor 522 can be utilized to activate the CUD 510 to capture the near field imaging data. In this manner, battery is saved by not constantly attempting to capture the near field imaging data with the second imaging sensor 516.

In one example, light elements 528 are disposed beneath the display screen 508 as described in more detail above. In particular, the light elements are placed proximate to openings defined by the camera display pixels in the CUD region. The CUD region includes all portions of the electronic device 502 that are vertical from the CUD 510. Additionally, as explained above, the display pixels in the CUD region of the display are the camera display pixels that define openings for the passage of light that allow the imaging sensors 514, 516 to obtain, or capture image data.

The light elements 528 in one example are each positioned underneath the CUD region of the display to provide an auxiliary light output through the opening defined by the camera display pixels. Still, in other embodiments, at least some, if not all of the light elements 528 are not under the CUD region of the display. Instead, the light elements 528 are directional, angled, or the like, to emit light through the openings defined by the camera display pixels.

In yet another example, light elements 528 are both underneath the CUD region of the display, and not underneath the CUD region of the display. Both the light elements 528 underneath the CUD region of the display and the light element 528 not underneath the CUD region of the display may be directional, angled, or the like, to emit wavelengths of a light output through an opening defined by the camera display pixels. In example embodiments, more than one light element 528 emits light through the same opening defined by the camera display pixels, including light that converges with one another. In this manner, the light elements 528 can be controlled to provide numerous colors and intensities at a single opening defined by the camera display pixels.

The light elements 528 can also be configured to provide reduced, or eliminate an auxiliary light output when the CUD 510 is operating in a first mode, such as when far field image data capture is occurring. In this manner, battery life for operating the light elements 528 is saved. The light elements 528 can additionally be configured to be turned on, or increase brightness or intensity in a second mode when near field image data capture is occurring. In such a second mode, the CUD 510 functions as a biometric sensor for capturing near field image data, such as of a fingerprint. Because the fingerprint is to be pressed against the display screen, blocking exterior lighting, by turning on, or increasing the intensity of the auxiliary light output, more near field image data can be captured improving functionality of the electronic device.

The system 500 may also include an actuating device 530. The actuating device 530 can be a mechanical switch, electrically actuated switch, magnetically operated polarization switch, or the like. In particular, the actuating device operates a component of the system 500 to change the operation of the CUD 510 from a first operating mode to a second operating mode. As an example, in one example, when an optical reflector is utilized to reflect light to create a first light path and a second light path, a mechanical switch is provided to rotate the optical reflector from a first position to a second position. Alternatively, the actuating device 530 can be a magnetic device that changes the polarization of the optical reflector such that in a first mode a first polarization is provided that reflects light to form a first path, and in a second mode a second polarization is provided that allows the light to transmit through the optical defector to form a second light path.

Figure 6:
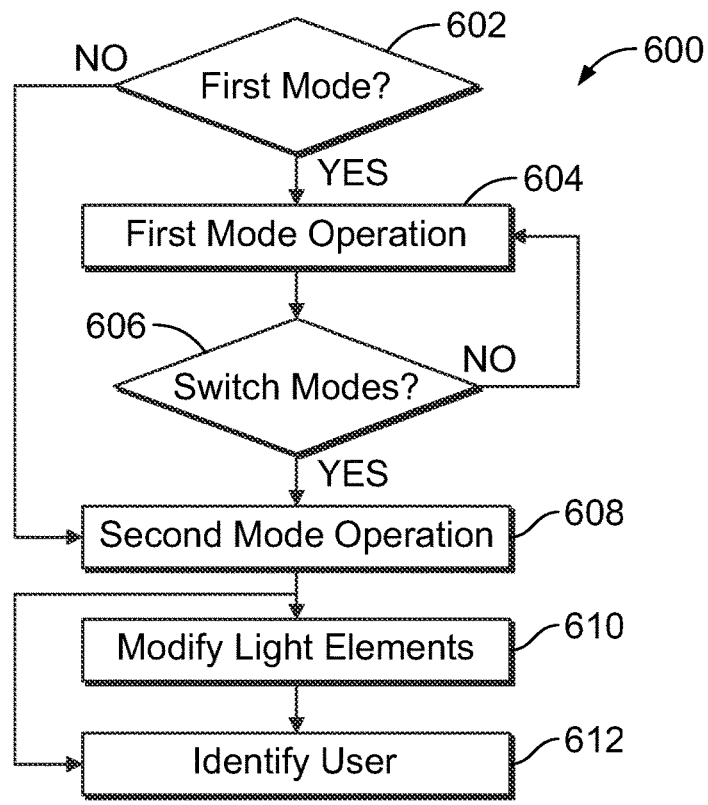
FIG. 6 illustrates a flow block diagram of a method of identifying a user of an electronic device in accordance with an embodiment herein.

FIG. 6 illustrates a flow block diagram of a method 600 of identifying a user of an electronic device. In one example the electronic device and system illustrated in FIGS. 1-5 are utilized to implement the method. In an embodiment, the electronic device operates in a first mode and a second mode based on the functionality of a camera under the display of the electronic device. In the first mode the camera functions as a typical camera, capturing far field image data based on operation by the user. The electronic device is in the first mode when the electronic device is in use and biometric information has not been requested. In this manner, the electronic device in the first mode may access the Internet, run applications, or the like. In the second mode, the camera of the electronic device functions as a biometric sensor, such as a fingerprint sensor, and functions to capture near field image data. In the second mode, the electronic device may be in a power saving operating condition, present a screen saver, not allow access to the Internet or applications, or the like. In particular, in the second mode, the biometric sensor functionality may be utilized to unlock, or access the first mode of operation. Specifically, the near field image data of the camera can be utilized to identify the user in order to allow access to operation of the electronic device.

In other examples, the second mode may also be presented when an application requires user identification for verification purposes. As an example, a shopping application may include the user prove their identification before auto populating credit card information, or allowing a purchase. As such, the application may prompt the user to provide identification in the form a fingerprint that is identified using the camera. Similarly, certain websites may be blocked through a parental control application, again requiring identification through the camera in a second mode. In this manner, the second mode of the camera may occur, even when the electronic device is in use, such as when prompted by an application, user, or the like.

At 602, one or more processors determine if the camera is operating in the first mode. In particular, the one or more processors can detect if an electronic device is in an energy savings mode, a screen savings mode, security mode, or the like such that identification of the user through a password, number sequence, biometric scanning identification, etc. is required to access applications of the electronic device. Similarly, the one or more processors similarly may determine if biometric scanning identification is required as a result of prompting from an application, prompting from a program, webpage, settings, or the like.

When biometric scanning identification functionality is not required, and the electronic device is in use, at 604, the camera is operating in the first mode. In the first mode, the camera captures far field image data. In the first mode the electronic device can be configured to be in use, including use of the Internet, use of applications, or the like. In one example, the electronic device can include a camera application that provides camera functionality including zooming, focus, image capture, rapid image capture, video recording, brightness control, image data management including storage and deleting of image data, or the like. In one example, in the first mode a user can take user portraits, such as selfies, record an event, take a family photo, etc. Specifically, the camera functions such that an imaging sensor captures far field image data.

At 606, the one or more processors determine if the camera should switch from operating in the first mode to operating in the second mode. In the second mode, as discussed in detail above, near-field image data is captured such that the camera functions as a biometric sensor. In particular, the imaging sensor is configured to capture the image data to provide enhanced detail of an object, such as a fingerprint, pressed against the display screen. In this manner, the near field image data captured can be compared to previously captured near field image data to determine a match between the two near field images.

In order to determine if the camera should be switched from the first mode to the second mode, the operation of the electronic device can be monitored for a change in operation state. For example, the one or more processors may monitor for when a screen saver activates, when battery savings is occurring, when an electronic device is placed in a security mode, when an electronic device is locked, etc. In each instance, in order to gain access to operation of one or more applications, the internet, the storage device of the electronic device, etc. a security measure is required to access the electronic device. To this end, to monitor for a change in operation state can include communicating with a security application. In one example, the security measure is a biometric scan of a fingerprint at the display screen.

In another embodiment, an application may require verification of a certain user when a device is used by more than one person. For example, a laptop computer shared by a family may have a password that allows all individuals in the family to access applications and the Internet. Still, certain applications may require extra verification such as use of the biometric identification to allow use of the application. A camera application may communicate with other applications of the electronic device to provide such verification for each application chosen by a user. Therefore, the one or more processors can monitor each application to determine if a user is attempting to access an application that requires verification.

In yet another example, an application, a webpage on the Internet, or the like may require verification of the user. For example, access to credit card information, social security information, or the like may be requested by an application. Before such information is permitted to be communicated, a verification step of identification may be required. As a result, the one or more processors monitor for such verification of identification from the applications, Internet, or the like. In each instance, a change from a first mode to a second mode is desired, and monitored. If a change from the first mode to the second mode does not occur at 606, then the one or more processors continue monitoring for a need the change from the first mode to the second mode at 606.

If at 602 the camera is not operating in the first mode, or 606, the camera is operating in the first mode, and a determination is made to switch operation to the second mode then at 608 the camera operates in the second mode to obtain near field image data. In the second mode, an imaging sensor functions to capture near field image data. In one example, a pressure sensor, motion sensor, light sensor, or the like are utilized to determine that a user's finger is pressed against the display screen. In one embodiment, only upon detecting such pressure, motion, change in light etc. is near field image data captured. In this manner, battery life is saved because image capture only occurs when needed. In another example, a manual actuation button may be provided on the electronic device that is actuated resulting in the camera to begin capturing near field image data.

At 610, optionally, the one or more processors modify the one or more light elements to provide an auxiliary light output based on operation of the camera in the first mode or the second mode. In one embodiment, to enhance the capture of near field image data, one or more light elements can emit light during the second mode of operation. In one example, the one or more light elements constantly emit light during the second mode. Alternatively, a pressure sensor, motion sensor, light sensor, or the like are utilized to determine that a user's finger is pressed against the display screen, and the one or more light elements emit light in response to determining the finger is pressed against the display screen. In another example, a manual actuation button may be provided on the electronic device that is actuated resulting in the at least one light element emitting light prior to the camera beginning to capture near field image data. In this manner, battery life is saved because the light elements are only emitted when image capture occurs.

At 612, the one or more processors identify the user of the electronic device. In one example, to identify the user of the electronic device, fingerprint data is captured in the second mode. The fingerprint data can then be read by a fingerprint reader, compared to image data related to a fingerprint image data previously captured, etc. Specifically, near field image data including macro imaging can be provided for a fingerprint reading. Based on the reading, comparison, etc. the one or more processors determine if the fingerprint data matches or substantially matches a fingerprint of the user stored in a storage device or memory of the electronic device. In particular, analysis may be undertaken related to the pattern of the fingerprint, including line separation, shape, or the like of the previously recorded image data and the fingerprint. The one or more processors can utilize an algorithm, mathematical model, mathematical function, or the like to compare the images to determine if the fingerprints match or substantially match. To provide a substantial match, a threshold can be provided, such as 95% of the features between the two images that match. When below the threshold, the user is considered not identified.

In one example, the camera application may cause operation of the electronic device to request a new fingerprint to use as the comparison fingerprint after a determined amount of time. In one example, after three months a prompt will be provided to update the image data. In this manner, the user can be identified utilizing the CUD without the need of additional hardware for bio scanning. As a result, a less expensive, more aesthetically pleasing electronic device is provided.

CONCLUSION

Before concluding, it is to be understood that although e.g. a software application for undertaking embodiments herein may be vended with a device such as the system 100, embodiments herein apply in instances where such an application is e.g. downloaded from a server to a device over a network such as the Internet. Furthermore, embodiments herein apply in instances where e.g. such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device having a camera under a display, comprising:
a display screen having display pixels and openings separating the display pixels;
a camera located proximate to the display and configured to obtain image data through the openings separating the display pixels; the image data including near field image data and far field image data;
the camera includes a first lens and an imaging sensor assembly, the imaging sensor assembly configured to detect near field image data at the display screen and far field image data spaced from the display screen;
the imaging sensor assembly including an optical reflector configured to form a first light path utilized to detect the near field image data and a second light path utilized to detect the far field image data;
a processor; and
a memory storing program instructions accessible by the processor, wherein, responsive to execution of the program instructions, the processor configured to:
capture the far field image data in a first mode;
capture the near field image data in a second mode; and
identify a user of the electronic device based on the near field image data.

2. The electronic device of claim 1, wherein in the first mode the processor is configured to capture front-facing far field image data and wherein the near field image data includes fingerprint data and in the second mode the processor is configured to read the fingerprint data using variable focus.

3. The electronic device of claim 1 wherein the imaging sensor assembly includes an imaging sensor that is configured to enable a variable focal length that has a range for capturing far field image data including user portraits in the first mode to capturing near field image data including macro imaging for fingerprint reading in the second mode.

4. The electronic device of claim 3 wherein the identification of the user is based on the macro imaging for fingerprint reading in the second mode.

5. The electronic device of claim 1, wherein the imaging sensor assembly is a biosensor in the second mode.

6. The electronic device of claim 1, wherein the imaging sensor assembly includes a first imaging sensor that receives the first light path to generate the near field imaging data, and a second imaging sensor that receives the second light path to generate the far field imaging data.

7. The electronic device of claim 1, wherein the optical reflector is configured to move from a first position that provides the first light path in the first mode, to a second position that provides the second light path in the second mode.

8. The electronic device of claim 1, wherein the first light path and second light path are parallel to the display screen.

9. The electronic device of claim 1, wherein the first lens is a macro lens.

10. The electronic device of claim 1, further comprising, one or more light elements disposed proximate the camera;
wherein, responsive to execution of the program instructions, the processor configured to:
modify the one or more light elements to provide an auxiliary light output based on operation of the camera in the first mode or the second mode.

11. A method, comprising:
under control of one or more processors including program instructions to:
capture, with a camera, far field image data from a first path of light from a reflector in a first mode;
capture, with the camera, near field image data from a second path of light from the reflector in a second mode;
monitor an electronic device that includes the camera under a display screen, to determine operation of the electronic device;
switch from the first mode to the second mode in response to determining the operation of the electronic device; and
identify a user of the electronic device based on the near field image data.

12. The method of claim 11, wherein capturing far field image data in the first mode includes capturing front-facing far field image data.

13. The method of claim 11, wherein the one or more processors include program instructions further to read fingerprint data using variable focus in the second mode.

14. The method of claim 11, wherein to capture the near field image data in the second mode includes focusing the camera on the display screen.

15. The method of claim 11, wherein to capture the far field image data in the first mode includes focusing the camera spaced from the display screen.

16. The method of claim 11, wherein monitoring the electronic device includes at least one of:
communicating with a security application; or
determining the electronic device is locked; or
determining the electronic device is using a screen saver on the display screen.

17. The method of claim 11, wherein identifying the user comprises:
capturing near field image data of a fingerprint of the user;
obtaining a previously recorded user fingerprint; and
comparing the near field image data of the fingerprint of the user to the previously recorded user fingerprint.

18. An electronic device having a camera under a display, comprising:
a display screen having display pixels and openings separating the display pixels;
a camera located proximate to the display and configured to obtain front-facing image data through the openings separating the display pixels; the front-facing image data including near field image data and far field image data;
the camera includes a macro lens and an optical reflector configured to generate a first light path and a second light path; and
an imaging sensor assembly configured to capture front-facing far field image data from the first path of light, including user portraits, in a first mode and operate as a biosensor to capture near field image data from the second path of light, including macro imaging, for fingerprint reading in the second mode.

19. The electronic device of claim 18, wherein the imaging sensor assembly includes a first imaging sensor configured to receive the first light path to detect the front-facing far field image data, and a second imaging sensor configured to receive the second light path to detect the near field image data.

20. The method of claim 11, further comprising: moving the reflector from a first position in the first mode, to a second position in the second mode.

* * * * *